United States Patent

[11] 3,630,786

[72] Inventors Motoharu Nishimura
Ibaraki
Masatugu Yoshida, Takatsuki, both of
Japan
[21] Appl. No. 864,391
[22] Filed Oct. 7, 1969
[45] Patented Dec. 28, 1971
[73] Assignee Yuasa Battery Company Limited
Takatsuki, Osaka Prefecture, Japan

[54] STORAGE BATTERY HAVING LIQUID-FILLING MEANS
4 Claims, 10 Drawing Figs.
[52] U.S. Cl. ..................................................... 136/170,
136/178, 136/182
[51] Int. Cl. ..................................................... H01m 1/02,
H01m 7/00
[50] Field of Search ........................................... 136/162,
170, 178, 182

[56] References Cited
UNITED STATES PATENTS

| | | | |
|---|---|---|---|
| 1,416,327 | 5/1922 | Blair .............................. | 136/162 |
| 2,220,005 | 10/1940 | Smith ............................. | 136/178 |
| 2,330,669 | 9/1943 | Biles .............................. | 136/178 |
| 3,492,169 | 1/1970 | Snyder ........................... | 136/162 |
| 3,494,798 | 2/1970 | Teeter et al. ................... | 136/162 |

Primary Examiner—Donald L. Walton
Attorney—Watson, Cole, Grindle & Watson

ABSTRACT: This invention relates to a liquid filling means equipped monoblock battery. The filling means comprises a cylindrical liquid receptacle and a rotary disc fitted thereinto and functions in the manner that when the disc is turned to bring its holes into communication with the liquid inlets of the cylindrical liquid receptacle, the exhaust ports of the receptacle are closed and when the holes are disconnected from the inlets, the ports communicates with the holes. The inlets and ports are connected to cells by ducts and exhaust pipes, respectively, and the lower ends of the ducts are on the same level as the normal level of electrolyte.

INVENTOR

Motoharu Nishimura
Masatugu Yoshida
BY
Watson, Cole, Grindle & Watson
ATTORNEY

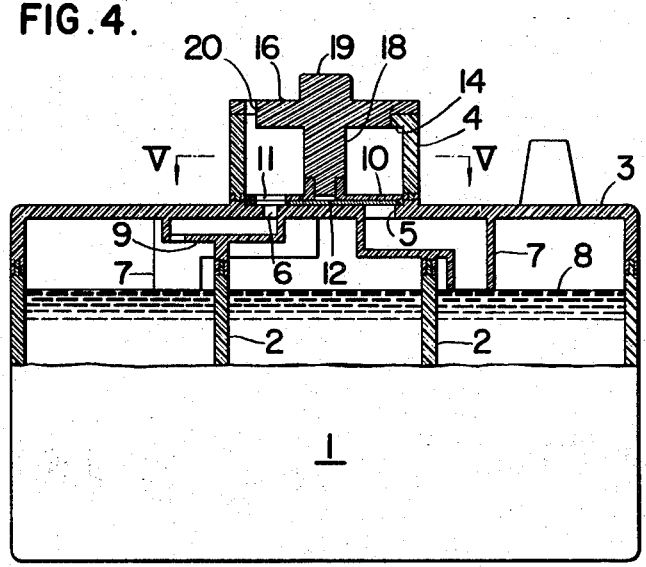
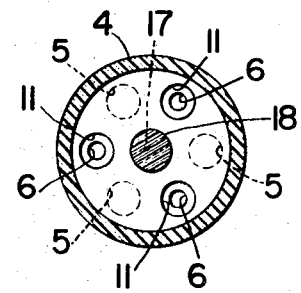
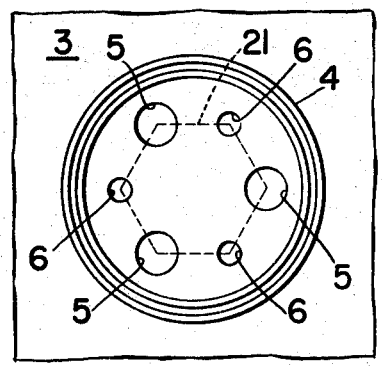
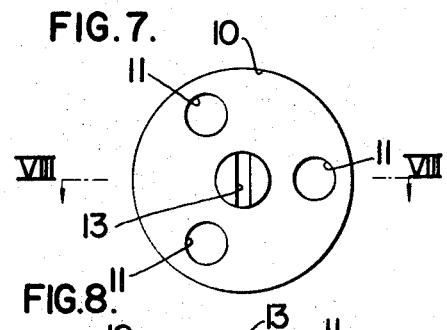
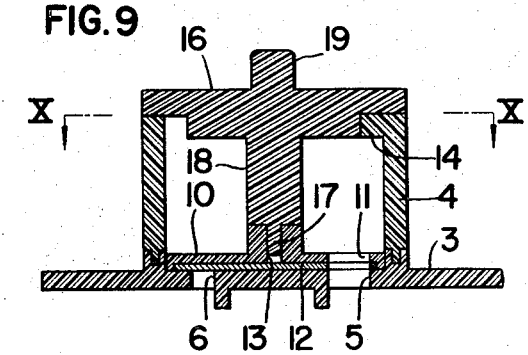
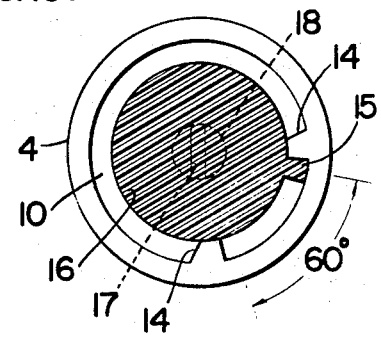

STORAGE BATTERY HAVING LIQUID-FILLING MEANS

This invention relates to a storage battery having a liquid-filling means. It is a conventional practice with a storage battery to refill the battery with liquid to suitably make up for the liquid decreased in quantity during use. In this case, in a storage battery of a known monoblock-type battery container, a liquid-filling plug is provided in each cell and care must be taken to fill each cell to its normal electrolyte level with liquid. As a result, this conventional monoblock-type battery had a disadvantage in that opening and closing of a plurality of plugs and liquid operation required much trouble and greatly impaired efficiency of filling work.

This invention has eradicated all the disadvantages described above.

A primary object of the invention is to provide a storage battery which is simple in liquid-filling operation.

Another object of the invention is to provide a storage battery in which the liquid-filling operation is positively carried out.

Still another object of the invention is to provide a storage battery having a low-cost liquid-filling means.

These and other objects and advantages of the invention will readily be understood from the following description with reference to the accompanying drawings in which embodiments of the battery of the invention having three cells are shown by way of example.

In the drawings:

FIG. 4 is a longitudinal sectional front view showing a state in which the rotary disc shown in FIG. 2 is rotated through 60°clockwise to be positioned so as to bring the holes of the rotary disc into agreement with exhaust ports;

FIG. 5 is a cross-sectional plan view taken along the line V—V of FIG. 4;

FIG. 6 is an enlarged plan view of the battery having the rotary disc and the rotary cover removed therefrom;

FIG. 7 is a plan view of the rotary disc alone;

FIG. 8 is a longitudinal sectional front view taken along the line VIII—VIII of FIG. 7;

FIG. 9 is a longitudinal sectional front view, enlarged in part, of FIG. 2; and

Figure 1:
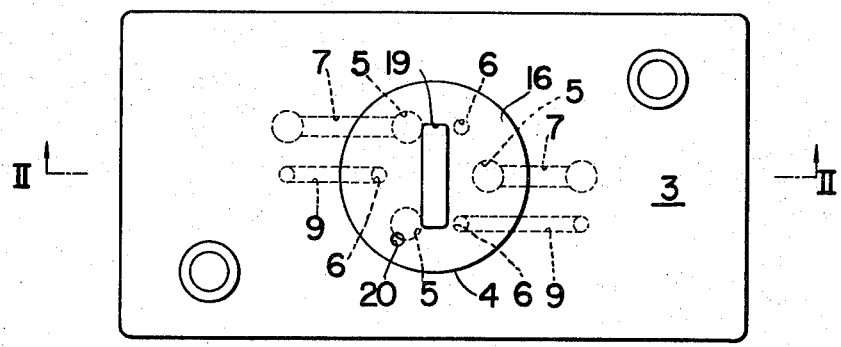
FIG. 1 is a plan view of a battery according to this invention.
Figure 2:
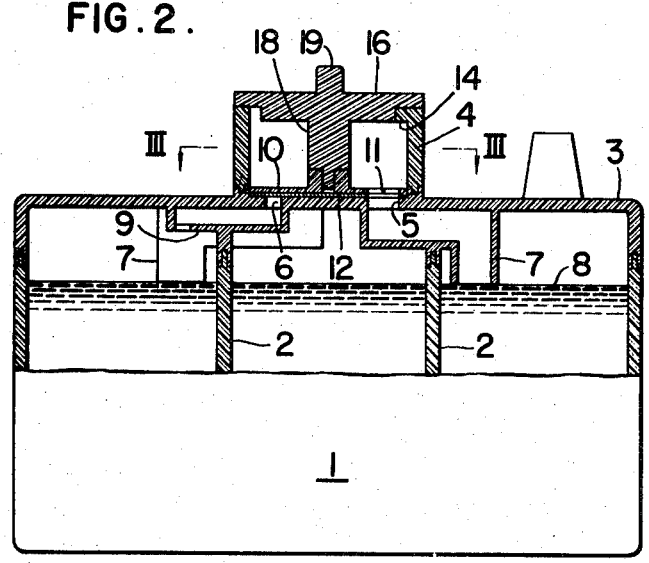
FIG. 2 is a longitudinal sectional view taken along the line II—II of FIG. 1 and shows a state in which the holes of a rotary disc are laid over liquid inlets so as to be in agreement.
Figure 3:
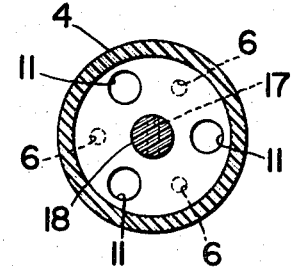
FIG. 3 is a cross-sectional plan view taken along the line III—III of FIG. 2.

FIG. 10 is a cross-sectional plan view taken along the line X—X of FIG. 9. In the drawings is shown a monoblock battery container 1 including three cells separated by partition walls 2 and in the container 1 are received known battery elements (not shown) such as plates and separators. A liquid receptacle 4 common to each cell is formed on the upper surface of a cover 3 made of the same acid resisting synthetic resin as the one of which the battery container 1 is made. The liquid receptacle 4 is formed on the bottom with the same number of liquid inlets 5 as the number of cells, three in the embodiment shown, and three exhaust ports 6, said inlets and ports being formed along the same circumference line in alternate relation to each other at each apex of a regular hexagon 21 (FIG. 6).

Each liquid inlet 5 communicates with each cell through each duct 7 and the lower end of the duct 7 is opened so as to be in agreement with the normal level 8 of the electrolyte in the cell. Each of the exhaust ports 6 is opened on the upper portion of each cell so as to communicate with the cell through each pipe 9.

A rotary disc 10 is fitted into the liquid receptacle 4 so as to come into close contact with the inner circumference of the receptacle 4. In the disc are formed three holes 11 of the same shape and size as the above-described liquid inlets 5 so as to agree in position with each other and a heavy body 12 each as lead is attached to the underside of the disc 10 and a groove 13 is formed in the middle of the upper surface of the disc.

A rotary cover 16 is put on the liquid receptacle 4. One projection 15 is formed on the outer circumference of the upper portion of the rotary cover 16. The projection 15 is so provided as to lie between two projections projecting beyond the inner circumference of the upper portion of the receptacle 4 and is adapted to move only between the projections 14 when the rotary cover 16 is turned. Namely, the range of movement of the rotary cover 16 is limited to 60° as shown in FIG. 10. Furthermore, a shaft 18 having a projection 17 at the lower end is provided in the middle of the underside of the rotary cover 16 and a knob 19 is provided on the upper surface of the rotary cover 16. When the rotary cover 16 is turned by the knob 19, it is turned to the amount of movement of the knob 19 because the projection 17 of the shaft 18 is fitted into the groove 13 of the rotary disc 10. Since this turning is limited by the projection 14 so as not to exceed more than 60°, the holes 11 completely agree in position with either liquid inlets 5 or exhaust ports 6.

When the holes 11 of the disc 10 are disconnected from the liquid inlets 5 by turning the disc 10, the exhaust ports 6 are brought into communication with the exhaust holes 11 of the rotary disc 10, with the result that the gas generated in the cells goes to the liquid receptacle 4 through pipes 9 and is then discharged into the atmosphere through an exhaust port 20 formed in the rotary cover 16. When the electrolyte is decreased in quantity to lower its level below the normal level, it must be refilled. In refilling, the rotary cover 16 is rotated through 60° by the knob 19 to bring the holes 11 of the rotary disc 10 into communication with the liquid inlets 5 and is removed, then an electrolyte is poured into the receptacle 4, and the electrolyte flows through each duct 7 into each cell. At this time the gas in the cell flows back through each duct. When the electrolyte has reached its normal level, even if pouring of electrolyte is continued, it is prevented from flowing into the cells because the exhaust ports 6 are completely sealed with the rotary disc 10. This may be taken as a sign by which to stop pouring and which indicates that the electrolyte has reached its normal level. Then, when the rotary cover 16 is fitted into the receptacle 4 and rotated through 60° to its original position, the disc 10 is rotated through 60° to its original position and the exhaust ports 6 are brought into communication with the holes 11, and a small amount of electrolyte remaining in the ducts drops into the cells. With this ends the liquid refilling operation.

A heavy body 12, for example a lead plate may be attached to the underside of the disc 10, but rather it may be preferably embedded into the disc 10. This makes the rotary disc heavy in weight, with the result that the air in the cells cannot raise the disc 10 and disc. of the liquid can be carried out smoothly. The rotary disc 10 having said heavy body 12 may be replaced by a rotary disc 10 having no such heavy body 12. In that case, the receptacle 4 may be of the construction in which it is provided on the lower portion of its inner wall with projections so as to place the disc 10 under constant pressure by the projections. The embodiment shown is a 6-volt monoblock battery including three cells, but the invention can be embodied in the monoblock battery including any desired number of cells.

This invention has been described with reference to an embodiment having round liquid holes and exhaust ports, but the shapes of the holes and ports need not always be round and they may be polygonal, and when the battery includes many cells, liquid inlets and exhaust ports may be formed respectively on a circumference line of small diameter concentric with the large diameter circumference line, and the holes 11 of the rotary disc may be formed in the position in which the exhaust ports 6 and the holes 11 agree with each other and the disc thus obtained may be closely fitted into the liquid receptacle.

In short, when the liquid inlets and the holes of the rotary disc are in agreement, the exhaust ports are disconnected from the holes of the rotary disc, and when the exhaust ports and the holes of the disc are in agreement, the liquid inlets are disconnected from the holes of the disc. Thus in either case, agreement of the holes with one group of inlets closes the other group of ports, whereby the object of this invention is achieved.

It should be noted that the embodiment and modification of the invention described are shown only by way of example and that therefore a number of other changes and modifications are possible without departing from the scope and spirit of the invention.

What is claimed is:

1. A storage battery having a liquid-filling means of the construction in which a monoblock battery including a plurality of cells is provided on the upper surface of its cover with a cylindrical receptacle and has liquid inlets and exhaust ports equal in number to cells formed alternately and at equal intervals from each other on the bottom of the receptacle along the circumference line of the bottom, said liquid inlets being connected to ducts having their lower ends suspended to the normal electrolyte level and said exhaust ports being connected to exhaust pipes having their ends opened on the upper portion of the cells, a rotary disc having holes capable of communication with each of said liquid inlets is fitted into said receptacle so as to come into contact with the bottom of the receptacle, thereby to cutoff communication of the exhaust parts with the holes of the rotary disc when the liquid inlets come into communication with the holes, and to cut off communication of said liquid inlets with said holes when said exhaust ports come into communication with the holes when said exhaust ports come into communication with the holes, and said rotary disc being adapted to be rotated by a rotary cover having an exhaust port and fitted into said receptacle.

2. A storage battery having a liquid-filling means according to claim 1 wherein said rotary disc has a heavy body attached thereto.

3 A storage battery having a liquid-filling means according to claim 1 wherein the total number of said inlets and said exhaust ports on the bottom of the receptacle is in excess of three.

4. A storage battery having a liquid-filling means according to claim 1 wherein said liquid inlets and exhaust ports respectively are formed on a circumference line of small diameter concentric with the said cylindrical receptacle.

* * * * *